(12) United States Patent
Yoshimura

(10) Patent No.: US 11,761,900 B2
(45) Date of Patent: Sep. 19, 2023

(54) LIGHT PROJECTING DEVICE

(71) Applicant: CCS Inc., Kyoto (JP)

(72) Inventor: Norihisa Yoshimura, Nagaokakyo (JP)

(73) Assignee: CCS INC., Kyoto (JP)

( * ) Notice: Subject to any disclaimer, the term of this patent is extended or adjusted under 35 U.S.C. 154(b) by 353 days.

(21) Appl. No.: 17/270,603

(22) PCT Filed: Aug. 29, 2019

(86) PCT No.: PCT/JP2019/033869
§ 371 (c)(1),
(2) Date: Feb. 23, 2021

(87) PCT Pub. No.: WO2020/045557
PCT Pub. Date: Mar. 5, 2020

(65) Prior Publication Data
US 2021/0247326 A1 Aug. 12, 2021

(30) Foreign Application Priority Data
Aug. 31, 2018 (JP) .................................. 2018-163523

(51) Int. Cl.
*G01N 21/88* (2006.01)
*F21V 8/00* (2006.01)

(52) U.S. Cl.
CPC ..... *G01N 21/8851* (2013.01); *G01N 21/8806* (2013.01); *G02B 6/0036* (2013.01)

(58) Field of Classification Search
CPC ... G01N 2021/8812; G01N 2021/8819; G01N 21/8806; G01N 21/8851; G01N 21/84;
(Continued)

(56) References Cited

U.S. PATENT DOCUMENTS 6,742,907 B2 * 6/2004 Funamoto ............ G02B 6/0036
362/625
2009/0218525 A1 * 9/2009 Ikeda .................... G02B 6/0036
362/558

(Continued)

FOREIGN PATENT DOCUMENTS

JP 2002109928 A 4/2002
JP 2003098093 A 4/2003
(Continued)

OTHER PUBLICATIONS

ISA Japan Patent Office, International Search Report Issued in International Application No. PCT/JP2019/033869, dated Oct. 29, 2019, WIPO, 4 pages.

(Continued)

*Primary Examiner* — Tri T Ton
(74) *Attorney, Agent, or Firm* — Alleman Hall Creasman & Tuttle LLP

(57) ABSTRACT

A light projecting device comprises a flat light guide plate and a light source that introduces light into the light guide plate from a side peripheral surface thereof. A plurality of concave parts are formed on one plate surface of the light guide plate, and the light entering the light guide plate reflects off the concave parts while spreading out, and the light is emitted outside from the other plate surface of the light guide plate. Each concave part is formed by a smooth concave curved surface. A tangential angle that is an angle between a tangential line at an opening edge of the concave part and the plate surface is set to be $\geq 50°$ and $\leq 85°$ in a cross-sectional shape of the concave part cut by a plane that is both perpendicular to the plate surface and passing through the center of the concave part.

6 Claims, 12 Drawing Sheets

(58) Field of Classification Search
CPC .. G02B 6/0036; G02B 6/0068; G02B 6/0091; G02B 6/0038; F21S 8/00
USPC ............... 356/237.1–237.6, 239.1–239.8
See application file for complete search history.

(56) References Cited

U.S. PATENT DOCUMENTS

| | | | |
|---|---|---|---|
| 2009/0302204 A1* | 12/2009 | Saito | G01N 21/8806 362/296.01 |
| 2013/0063980 A1 | 3/2013 | Ender | |
| 2019/0342477 A1 | 11/2019 | Hatabe | |

FOREIGN PATENT DOCUMENTS

| | | | |
|---|---|---|---|
| JP | 2007311365 A | 11/2007 | |
| JP | 2010112735 A | 5/2010 | |
| JP | 2011192484 A | 9/2011 | |
| JP | 2012528467 A | 11/2012 | |
| JP | 2013-206834 A | 10/2013 | |
| JP | 2016136124 A | 7/2016 | |
| KR | 20080012893 A | 2/2008 | |
| KR | 20100080785 A | 7/2010 | |
| WO | 2006120932 A1 | 11/2006 | |
| WO | 2009032813 A2 | 3/2009 | |
| WO | 2010138763 A1 | 12/2010 | |
| WO | 2018079742 A1 | 5/2018 | |

OTHER PUBLICATIONS

European Patent Office, Extended European Search Report Issued in Application No. 19855121.0, dated Apr. 4, 2022, Germany, 10 pages.
Do, Y. et al., "A Study on the surface characteristics of mold and injection molded part depending on mold fabrication methods of dot pattern of LGP of cellular phone: Laser Ablation, Chemical Etching, LiGA-Reflow method," The Optical Society of Korea Summer Meeting, 2007, 3 pages.
Hwang, C. et al., "Replication of concave and convex microlens array of light guide plate for liquid crystal display in injection molding," Journal of the KSDME, vol. 2, No. 2, Feb. 28, 2008, 4 pages.
Kim, J. et al., "A Study on the Fabrication Method of Mold for 2 inch LCD_BLU by 50μm Microlens: Effect of Different Aspect Ratio," Transactions of Materials Processing, vol. 16, No. 1, 2007, 6 pages.
Kim, J. et al., "Replication and Comparison of Concave and Convex Microlens Arrays of Light Guide Plate for Liquid Crystal Display in Injection Molding," Polymer Engineering and Science, 2010, 9 pages.
European Patent Office, Office Action Issued in Application No. 19855121.0, dated Mar. 31, 2023, Germany, 5 pages.
Japan Patent Office, Office Action Issued in Application No. 2020539581, dated Mar. 23, 2023, 6 pages.

* cited by examiner

■CONDITION   PITCH: 2.5x
CURVATURE: 0.025mm
THICKNESS: 5mm
MATERIAL: PMMA

TANGENTIAL ANGLE: 90°

TANGENTIAL ANGLE: 75°

TANGENTIAL ANGLE: 72.2°

■CONDITION

PITCH : 2x, 2.5x, 5x
CURVATURE : 0.025mm
THICKNESS : 5mm
MATERIAL : PMMA

PITCH : 2.5x
CURVATURE : 0.01mm, 0.025mm, 0.1mm
THICKNESS : 5mm
MATERIAL : PMMA

PITCH : 2.5x
CURVATURE : 0.025mm
THICKNESS : 5mm, 10mm
MATERIAL : PMMA

PITCH : 2.5x
CURVATURE : 0.025mm
THICKNESS : 5mm
MATERIAL : PMMA, ZeonexE48R

■CONDITION

PITCH : 2x, 2.5x, 5x
CURVATURE : 0.025mm
THICKNESS : 5mm
MATERIAL : PMMA

PITCH : 2.5x
CURVATURE : 0.01mm, 0.025mm, 0.1mm
THICKNESS : 5mm
MATERIAL : PMMA

PITCH : 2.5x
CURVATURE : 0.025mm
THICKNESS : 5mm, 10mm
MATERIAL : PMMA

PITCH : 2.5x
CURVATURE : 0.025mm
THICKNESS : 5mm
MATERIAL : PMMA, ZeonexE48R

■CONDITION
PITCH : 2.5x
CURVATURE : 0.025mm
THICKNESS : 5mm
MATERIAL : PMMA

TANGENTIAL ANGLE 90°

TANGENTIAL ANGLE 75°

TANGENTIAL ANGLE 72.2°

TANGENTIAL ANGLE 55°

TANGENTIAL ANGLE 50°

TANGENTIAL ANGLE 45°

PV VALUE: PEAK TO VALLEY VALUE OF DIFFERENCE
FROM LAMBERTIAN LIGHT DISTRIBUTION

■CONDITION

PITCH: 2x, 2.5x, 5x
CURVATURE: 0.025mm
THICKNESS: 5mm
MATERIAL: PMMA

PITCH: 2.5x
CURVATURE: 0.01mm, 0.025mm, 0.1mm
THICKNESS: 5mm
MATERIAL: PMMA

PITCH: 2.5x
CURVATURE: 0.025mm
THICKNESS: 5mm, 10mm
MATERIAL: PMMA

PITCH: 2.5x
CURVATURE: 0.025mm
THICKNESS: 5mm
MATERIAL: PMMA, ZeonexE48R

LIGHT PROJECTING DEVICE

FIELD OF THE ART

This invention relates to a light projecting device that irradiates a light for surface inspection of a product.

BACKGROUND ART

Conventionally known is a light projecting device (hereinafter referred to as an omnidirectional light projecting device) that can inspect an object (hereinafter referred to as a workpiece) such as a product or the like by irradiating a light that is as uniform as possible from all directions. Since the omnidirectional light projecting device does not create shadows on a portion of the workpiece to be inspected, even though there is a curved surface or unevenness on the workpiece and it is possible to make printing or color difference on a surface of the workpiece distinctively, the omnidirectional light projecting device is suitable for inspection of spherical workpieces, round-shaped workpieces, or soldered portions.

Since the omnidirectional light projecting device is a pioneering device in terms of a dome type, the height dimension becomes slightly large. As a result, recently, as shown in Patent Document 1 and Patent Document 2, a flat plate type omnidirectional light projecting device using a flat plate light guide plate has been developed.

The flat plate type omnidirectional light projecting device of this kind comprises a flat plate type light guide plate and a plurality of LEDs (light-emitting diodes) arranged to surround the light guide plate, and a plurality of minute diffuse reflecting parts are arranged on one plate surface of the light guide plate with gaps between each of the adjacent diffuse reflecting parts. A term "diffuse" in this specification also includes, for example, a state wherein the light spreads by reflection on a spherical surface.

While the light that is emitted from the LEDs and that enters an inside of the light guide plate through a side peripheral surface thereof is totally reflected repeatedly between the surfaces, facing each other, of the light guide plate and propagates, light that is projected on the diffuse reflecting part among the above-mentioned light is reflected while spreading, and is emitted to the outside from the other plate surface of the light guide plate, in other words, only the other plate surface of the light guide plate is made to emit the light in a planar shape. For the diffuse reflecting part, a dot layer (the Patent Document 1) formed by painting or printing on one of the plate surfaces of the light guide plate, or a V-shaped concave part formed on one of the plate surfaces (the Patent Document 2) is used.

In case of inspecting the workpiece, the other plate surface of the light guide plate is placed to face the workpiece and the workpiece is illuminated by the diffused light emitted from the other plate surface of the light guide plate. Then, the work illuminated by the diffused light is observed and inspected from the opposite side across the light guide plate, i.e., from one of the plate surfaces of the light guide plate through the light guide plate, by means of an observation means such as a camera or the naked eye.

However, for this kind of the flat plate type omnidirectional light projecting device, the light guided into the inside of the light guide plate leaks slightly also from the plate surface (one of the plate surfaces), of the light guide plate, on the side of the observation means, and the leaked light becomes a noise component, which may deteriorate an S/N (signal/noise) ratio in the inspection.

In addition, since the light distribution of the diffused light emitted from the light guide plate toward the workpiece is biased on a V-shaped concave part like the above-mentioned Patent Document 2, it is also recognized that the uniformity of the light irradiated on the workpiece is inferior to that of the dome-shaped light guide plate, and the accuracy of the inspection cannot be improved.

PRIOR ART DOCUMENTS

Patent Document

Patent Document 1: Japanese Unexamined Patent Application Publication No. 2003-98093
Patent Document 2: Japanese Unexamined Patent Application Publication No. 2016-136124

DISCLOSURE OF THE INVENTION

Problems to be Solved by the Invention

The present claimed invention has been made in view of the above-mentioned problems and intends to provide a light projecting device that reduces a noise component by reducing the light leaking out to a side of observation means from a light guide plate as much as possible, as well as improves uniformity of the light irradiated to an object to be inspected so as to improve inspection accuracy.

Means to Solve the Problems

More specifically, a light projecting device in accordance with the present claimed invention comprises a flat plate-shaped light guide plate and a light source body that introduces light from a side peripheral surface of the light guide plate to the inside thereof, wherein a plurality of concave parts are formed on one plate surface of the light guide plate, and is so configured that the light entering the light guide plate is reflected at the concave parts while spreading and is emitted to the outside from the other plate surface of the light guide plate and then is irradiated to a predetermined object, and the object can be observed through the light guide plate from a side of the one plate surface of the light guide plate.

Then, the light projecting device is characterized by that the surface of each of the concave parts is formed with a smooth concave curved surface, and a tangential angle that is an angle between a tangential line at an opening edge of the concave part and the plate surface is set to be greater than or equal to 50° and less than or equal to 85° in a cross-sectional shape of the concave part cut by a plane that is both perpendicular to the plate surface and passing through the center of the concave part.

The present claimed invention is a revolutionary invention invented by the inventor who first focuses attention on that a portion of the light that is projected on the concave part passes the light guide plate and is emitted to the one plate surface side of the light guide plate as the leaked light and the light distribution property and the intensity of the leaked light can be controlled by adjusting the tangential angle at the opening edge of the concave part.

More specifically, in accordance with this invention, since the intensity of the light in the direction perpendicular to the plate surface is suppressed in the light distribution property of the leaked light if the tangential angle at the opening edge of the concave part is set to be less than or equal to 85°, the leaked light entering an observation means that is arranged to face both the plate surface and a direction perpendicular to the plate surface is reduced so that it is possible to improve an S/N ratio.

On the other hand, if the tangential angle is made too small, the concave part becomes close to a flat surface and the degree of diffusion (uniformity) of the light (also called as the irradiated light) that is diffused and reflected to the object side becomes low, but since the tangential angle is set to be greater than or equal to 50°, it is possible to secure suitable illumination on the object.

In addition, since a surface of the concave part is a smooth curved surface, it is possible to improve the uniformity of the light that is diffused and reflected to the object side.

The upper limit of the tangential angle is preferably less than or equal to 80°, and more preferably less than or equal to 75°. In addition, it is furthermore preferable that the lower limit of the tangential angle is greater than or equal to 52°~53°, and more preferably greater than or equal to 55°.

As a concrete shape of the concave part represented is a partially concave sphere shape.

In order to make it possible to process the concave part, it is preferable that an opening diameter of the concave part is greater than or equal to 0.02 mm. In order to make it possible to reduce glare of the concave part on the observation means, it is preferable that an opening diameter of the concave part is less than or equal to 0.2 mm.

The uniformity of the irradiated light is related to a pitch between concave parts, and from this point of view, it is preferable that the pitch between adjacent concave parts is greater than or equal to twice and less than or equal to five times the opening diameter of the concave part.

Effect of the Invention

In accordance with the light projecting device having the above-mentioned arrangement, it is possible to reduce the leaked light from the light guide plate to an observation means side as much as possible and thereby reduce a noise component, as well as to increase uniformity of the light irradiated to the object. As a result, it is possible to improve the inspection accuracy.

EXPLANATION OF REFERENCE CHARACTERS

Figure 1:
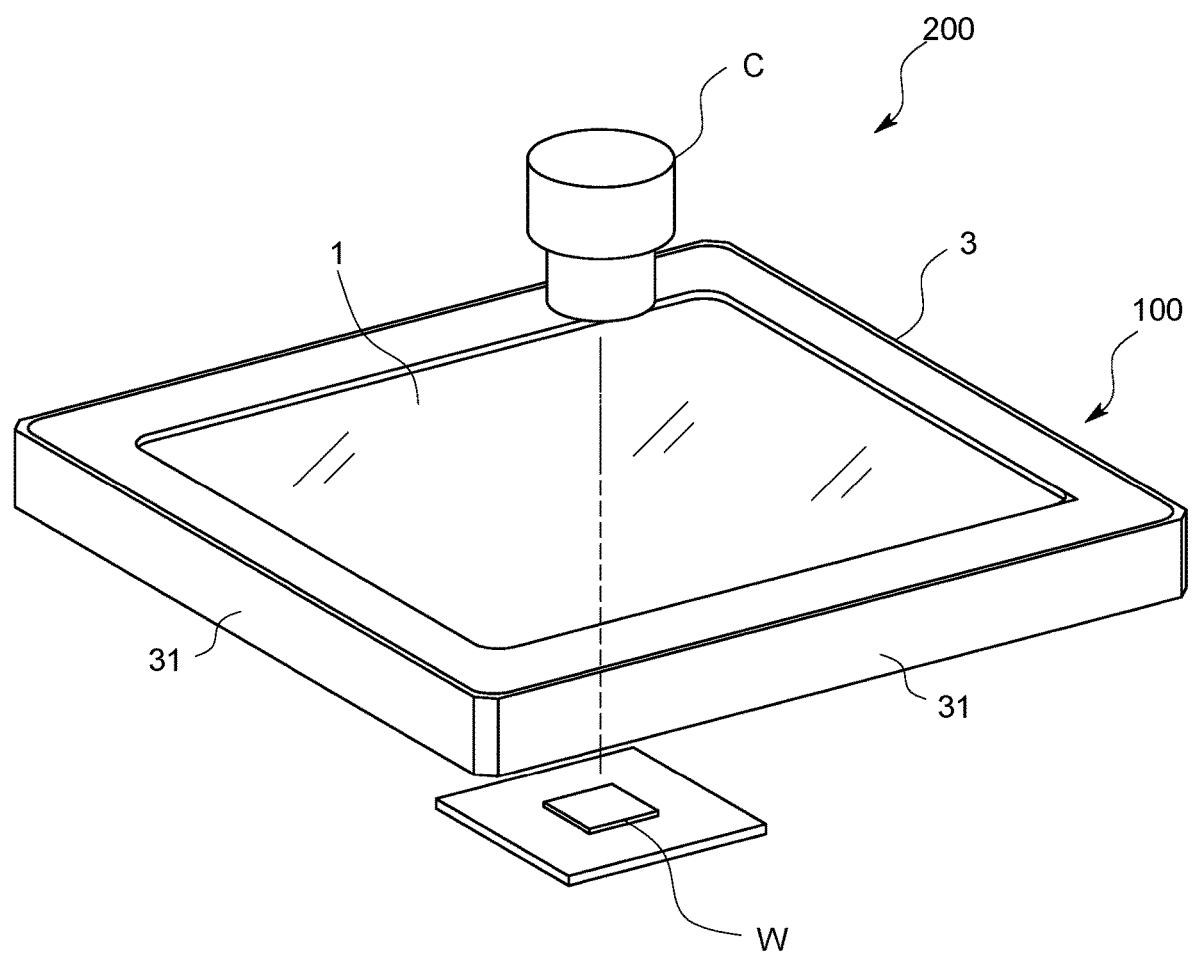
FIG. 1 is a perspective view showing an inspection system containing a light projecting device for inspection in accordance with this embodiment.

100 . . . light projecting device for inspection
200 . . . inspection system
1 . . . light guide plate
1a . . . one plate surface
1b . . . other plate surface
1c . . . side peripheral surface
2 . . . LED (illuminant)
4 . . . concave part

BEST MODES OF EMBODYING THE INVENTION

An embodiment of a light projecting device for inspection 100, which is an example of a light projecting device according to the present invention, will be explained based on drawings.

The light projecting device for inspection 100 is, as shown in FIG. 1, thin and square in shape as a whole, and as described in the background art, it has a function of canceling shadows caused by curved surfaces of a workpiece W and some unevenness of the surface of the workpiece W by irradiating uniform diffuse light from almost omnidirectional (almost 180° all-sky direction) to the workpiece W, which is the object to be inspected.

Figure 2:
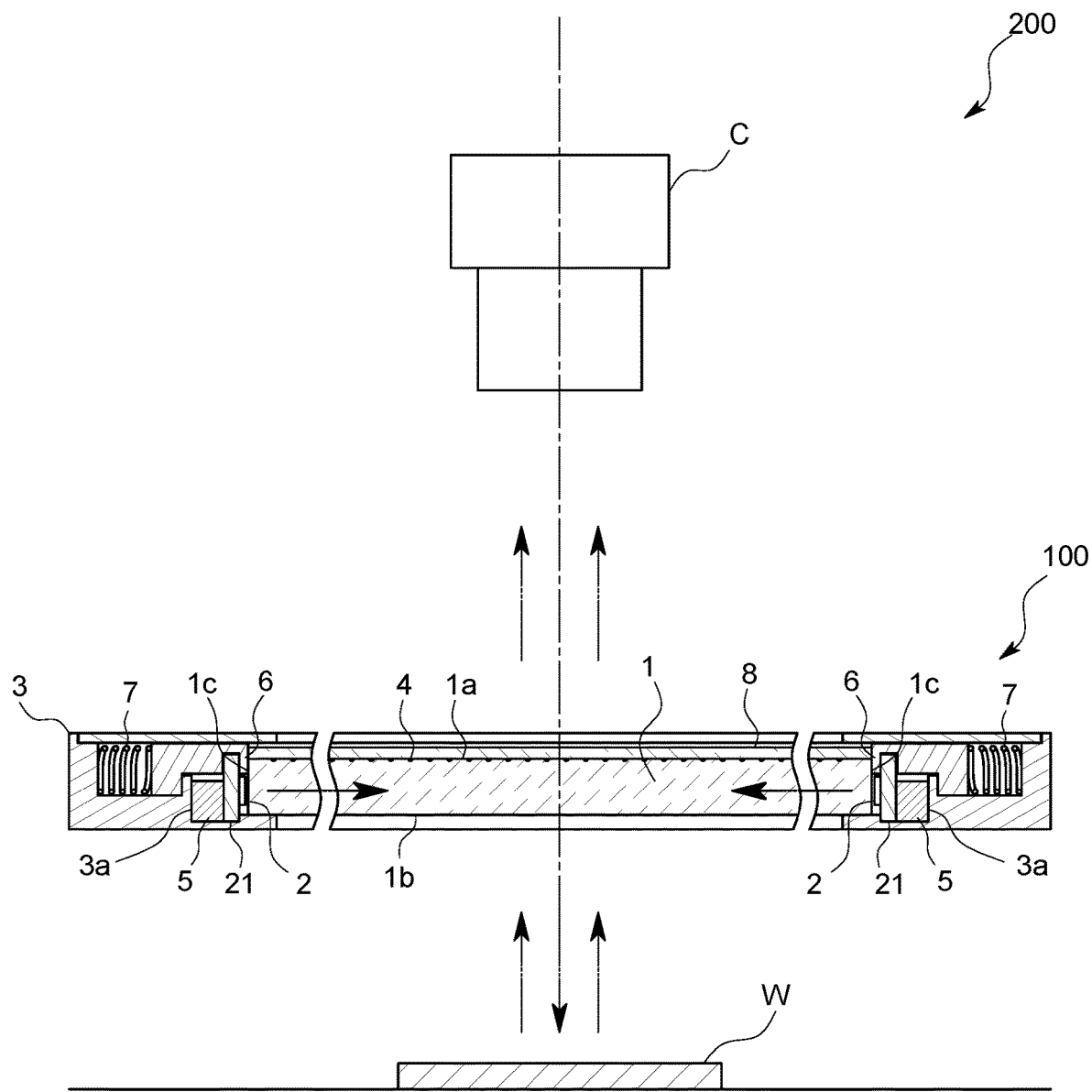
FIG. 2 is a longitudinal cross-sectional view of the light projecting device for inspection in accordance with this embodiment.

If more specifically explained, the light projecting device for inspection 100, as shown in FIG. 1 and FIG. 2, comprises a flat plate shaped light guide plate 1, a plurality of LEDs (light emitting diodes) 2 as a light source arranged to surround the light guide plate 1, and a frame body 3 that houses the LEDs 2 and that supports a side peripheral edge part of the light guide plate 1.

Figure 3:
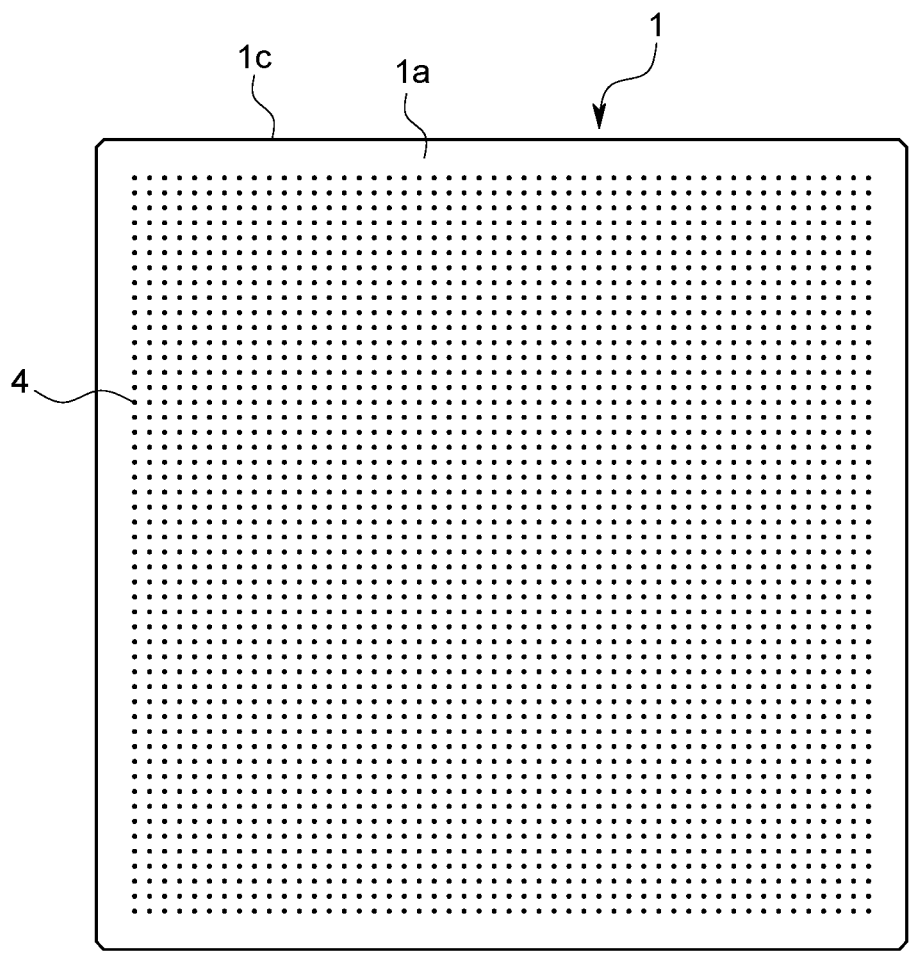
FIG. 3 is a plane view viewed from one plate surface side of a light guide plate in accordance with this embodiment.

The light guide plate 1 is, as shown in FIG. 3, for example, a transparent plate made of resin (here, made of PMMA) of an equal thickness and a square shape. A large number of minute concave parts 4 are formed on one plate surface 1a of parallel plate surfaces facing each other, and the other plate surface 1b is formed to be a smooth mirror finished surface.

Figure 4:
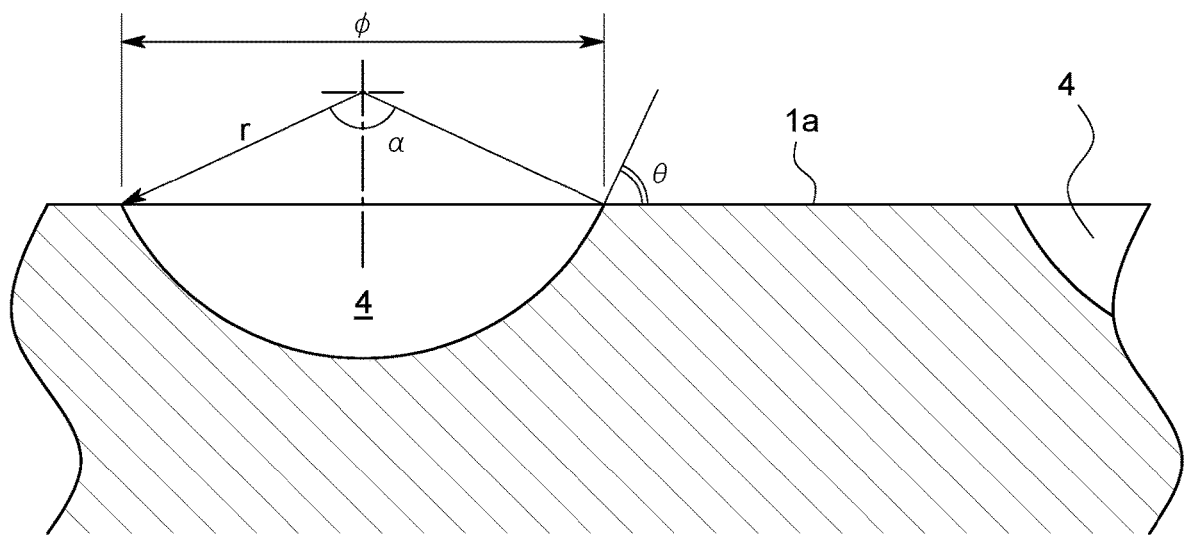
FIG. 4 is a cross-sectional view of a concave part cut by a plane that is both perpendicular to the plate surface and passing a center of the concave part in accordance with this embodiment.
Figure 5:
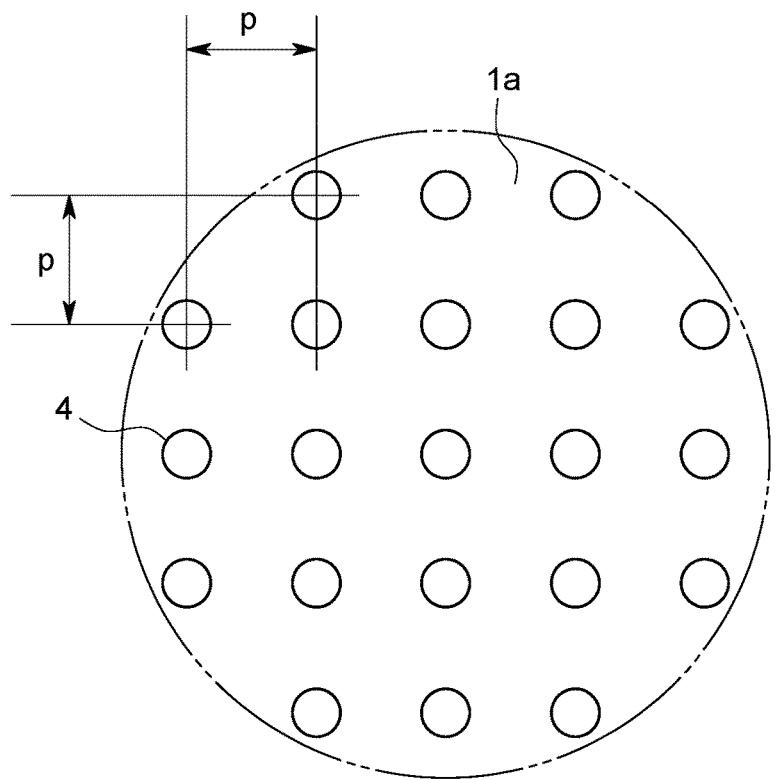
FIG. 5 is a partially enlarged view of the concave part viewed from a plane surface direction in accordance with this embodiment.

The concave parts 4 are, as shown in FIG. 4 and FIG. 5, in a form of partially concave sphere drilled through the entire one plate surface 1a of the light guide plate 1, in this embodiment, and the concave parts 4 are aligned on tetragonal lattice points with regularly.

As shown in FIG. 2, the LEDs 2 are, for example, of the surface mounted type, and in this embodiment, a plurality of the LEDs 2 are loaded in a single row on a surface of a thin and long wiring board 21. A plurality of colors, such as white, red, blue, etc., are available as a lineup of a luminescent color.

As shown in FIG. 1 and FIG. 2, the frame 3 has a square frame shape comprising four edge members 31, and each of which is provided with a bottomed groove 3a opening inward and extending from an end to the other end along a longitudinal direction. A peripheral edge part of the light guide plate 1 is fitted into the bottomed groove 3a and the light guide plate 1 is held in this bottomed groove 3a. In addition, the wiring board 21 is mounted on a bottom part of the bottomed groove 3a, and is so configured that a light-emitting surface of the LEDs 2 mounted on the wiring board 21 faces a side peripheral surface 1c of the light guide plate 1. With this configuration, the light emitted from the LEDs 2 is to be introduced into the inner part of the light guide plate 1 from the four side peripheral surfaces 1c.

In accordance with the light projecting device for inspection 100 having this configuration, the light emitted from the LEDs 2 enters through the four side peripheral surfaces 1c of the light guide plate 1 and travels the inner part of the light guide plate 1 while repeatedly being totally reflected between plate surfaces, facing each other, of the light guide plate 1. Most of the light collides with the concave parts 4 while traveling, and then the light is diffusely reflected and emitted outside from the other plate surface 1b of the light guide plate 1. In other words, the other plate surface 1b becomes the light-emitting surface. Although the light also slightly leaks from the one plate surface 1a, this leaked light will be described below.

In FIG. 2, a reference character 8 is a transparent cover that covers the one plate surface 1a of the light guide plate 1. A reference character 5 is a viscoelastic thermal conductor 5 that intervenes between a back surface of the wiring board 21 and the frame body 3 and that adheres to both of them to conduct heat of LED 2 to the frame 3 and dissipates the heat. A reference character 6 is a spacer 6 that intervenes between a front surface of the wiring board 21 and the side peripheral surface 1c of the light guide plate 1 to maintain a constant distance between them.

In this embodiment, as shown in FIG. 2, the spacer 6 is urged toward an inside (in a direction of the opening of the bottomed groove 3a) by an elastic body 7 (a coil spring or a plate spring) that is arranged at an outside of the spacer 6 so that a frontside touching surface of the spacer 6 is in close contact with the side peripheral surface 1c of the light guide plate 1.

On the other hand, the wiring board 21 (and the LEDs 2) is urged toward the inside (in the direction of the opening of the bottomed groove 3a) by the thermal conductor 5 so that the wiring board 21 (and the LEDs 2) is in close contact with a backside touching surface of the spacer 6.

In accordance with this arrangement, the spacer 6 intervenes between the front surface of the wiring board 21 and the side peripheral surface 1c of the light guide plate 1 and the spacer 6 is in close contact with the front surface of the wiring board 21 and the side peripheral surface 1c so that the distance between them is maintained constant.

With regard to this structure, it may be added that the light guide plate 1 is held by the spacer 6 that face each other and that are elastically urged inward in a direction parallel to the plate surface of the light guide plate 1, and this structure makes it possible to absorb the elongation of the light guide plate 1 due to the heat generated by the lighting of the LEDs 2 by the contraction of the elastic body 7. For this purpose, the maximum shrinkage of the elastic body 7 is set to be greater than or equal to the maximum elongation allowance of the light guide plate 1 due to the expected heat generation.

On the other hand, as the elongation of the light guide plate 1 pushes and moves the LEDs 2 and the wiring board 21 toward the outside through the spacer 6, the maximum shrinkage of the thermal conductor 5 due to the room temperature is set to be greater than or equal to the above-mentioned maximum elongation of the light guide plate 1 so that the movement of the LEDs 2 and the wiring board 21 due to the elongation of the light guide plate 1 can be absorbed by shrinking the thermal conductor 5.

Next, an inspection system 200 using the light projecting device for inspection 100 having the above-mentioned arrangement will be briefly explained. This inspection system 200 is, as shown in FIG. 1 and FIG. 2, provided with a camera C in addition to the light projecting device 100. The other plate surface 1b of the light guide plate 1 is arranged to face the workpiece W, and the workpiece W is illuminated by the diffused light emitted from the other plate surface 1b, while the illuminated workpiece W is imaged from the opposite side with the light guide plate 1, namely, from the one plate surfaces 1a side of the light guide plate 1 by the camera C and the imaged picture is used for inspection.

Now, the concave part 4 has a following arrangement in this embodiment under the above-mentioned premise configuration.

More specifically, as shown in FIG. 4 and FIG. 5, a tangential angle θ (or ½ of a center angle α of the concave part 4), which is an angle between a tangential line at an opening edge of the concave part 4 and the plate surface 1a in a cross-sectional shape of the concave part 4 cut by a plane that is both passing through the center of the concave part 4 and perpendicular to the plate surface 1a is set to be greater than or equal to 55° and less than or equal to 75°, an opening diameter φ of the concave part 4 is set to be greater than or equal to 0.02 mm and less than or equal to 0.2 mm, and a pitch p between two adjacent concave parts 4 and 4 is set to be greater than or equal to twice and less than or equal to five times the opening diameter φ.

In accordance with this arrangement, since the intensity of the light in the direction perpendicular to the plate surface 1a is suppressed in the light distribution property of the leaked light emitted to the camera C side among the light entering the light guide plate 1, the leaked light entering the camera C that is arranged to face both the plate surface 1a and a direction perpendicular to the plate surface 1a is reduced so that an S/N (signal/noise) ratio in the imaged picture is improved.

On the other hand, if the tangential angle θ is made too small, the concave part 4 becomes close to a flat surface and the degree of diffusion (uniformity) of the irradiated light that is diffused and reflected to the workpiece W side becomes low, but since the tangential angle θ is set at greater than or equal to 55°, it is possible to solve such a problem and to secure suitable illumination on the workpiece W.

Next, concrete simulation results verifying the above-mentioned effects will be described.

First, the property of the leaked light that leaks to the camera C side will be described.

Figure 6:
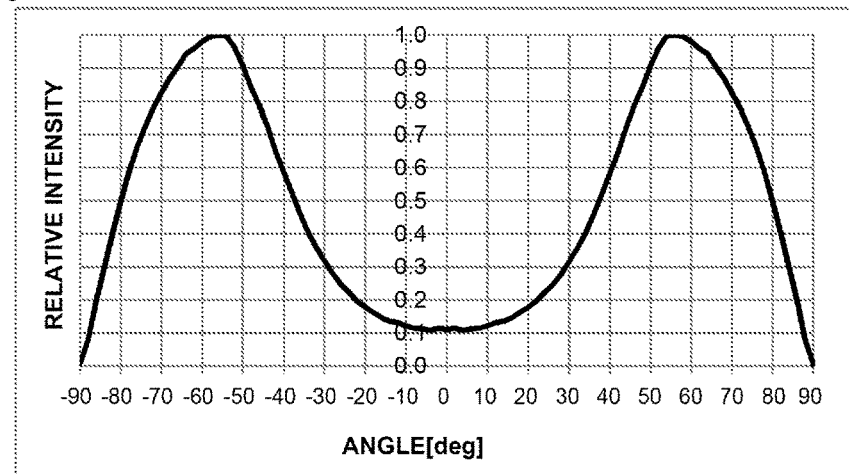
FIG. 6 is a view showing the light distribution property of leaked light at tangential angles θ of 90°, 75°, and 72.2° respectively.
Figure 6:
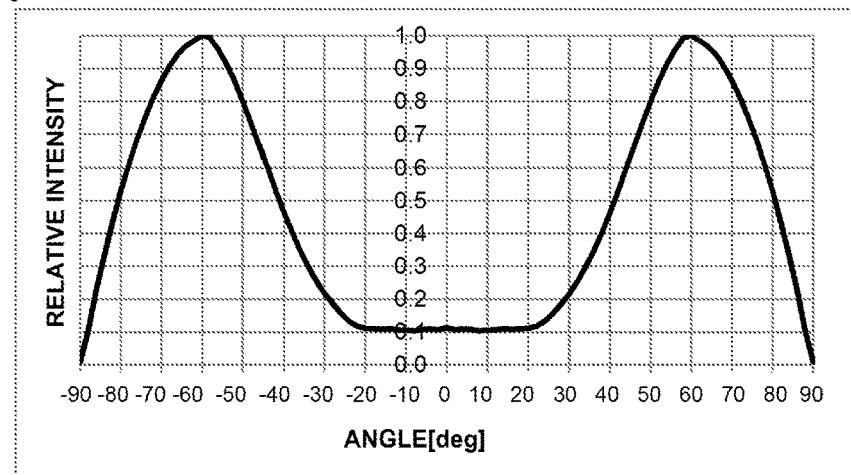
Figure 6:
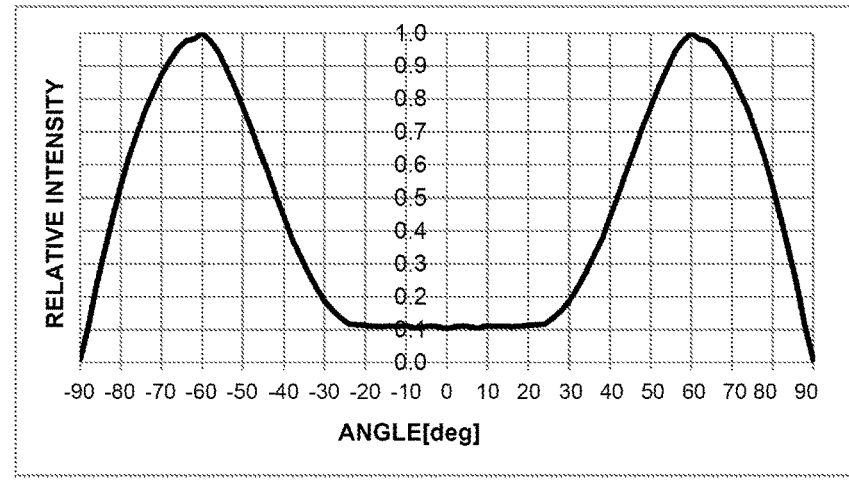
Figure 7:
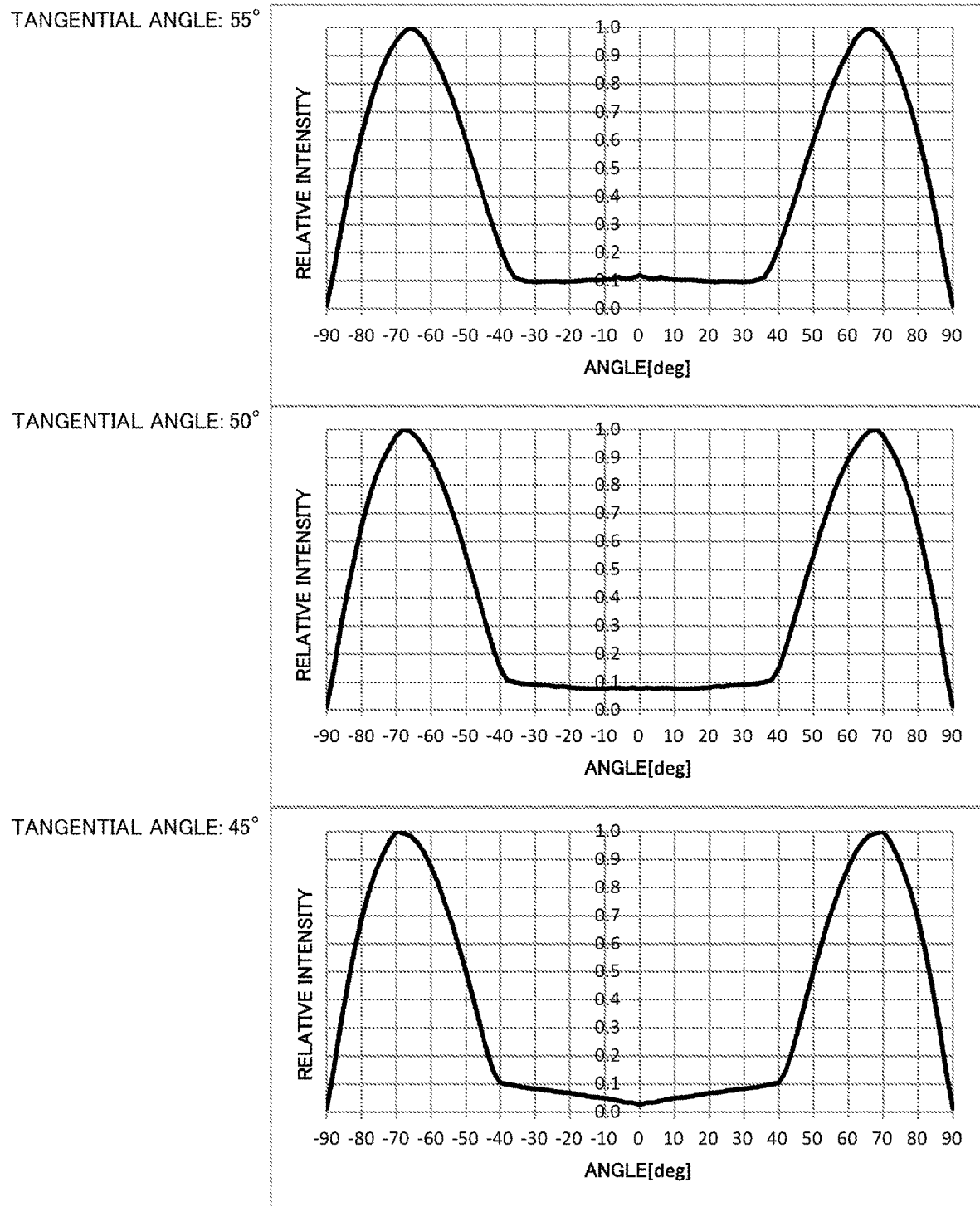
FIG. 7 is a view showing the light distribution property of the leaked light at the tangential angles θ of 55°, 50° and 45° respectively

FIG. 6 and FIG. 7 show each of the light distribution property of the leaked light with the tangential angles θ being 90°, 75°, 72.2°, 55°, 50°, and 45°. The light distribution property here is the light distribution property at a time when the light projecting device for inspection 100 can be considered as a point light source viewed from a point that is sufficiently separated from the light projecting device for inspection 100.

As is clear from FIG. 6 and FIG. 7, it can be seen that the smaller the tangential angle θ, the wider the range of the angle having low light intensity with the vertical direction centered.

Then, since the leaked light that is emitted in the range of an angle perpendicular to the one plate surface 1a±20° enters the camera C at the most, the ratio of the light energy of the leaked light in the range of the angle to the light energy emitted on the workpiece W side is considered as a noise ratio (an inverse number of the S/N ratio) and the relationship between the tangential angle θ and the noise ratio was investigated. The result is shown in FIG. 8.

Figure 8:
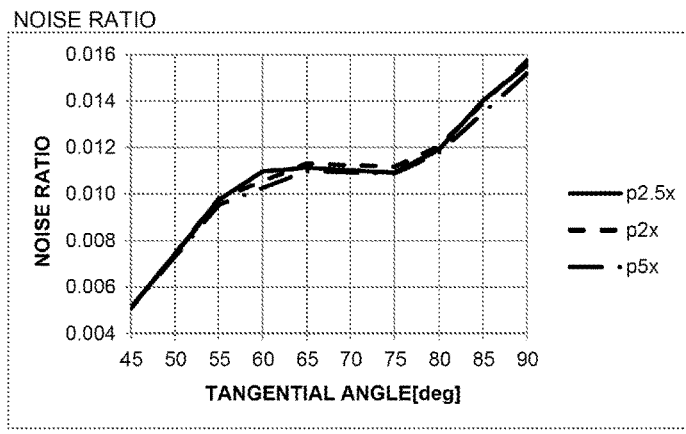
FIG. 8 is graphs showing a relationship between the tangential angle θ and a noise ratio.
Figure 8:
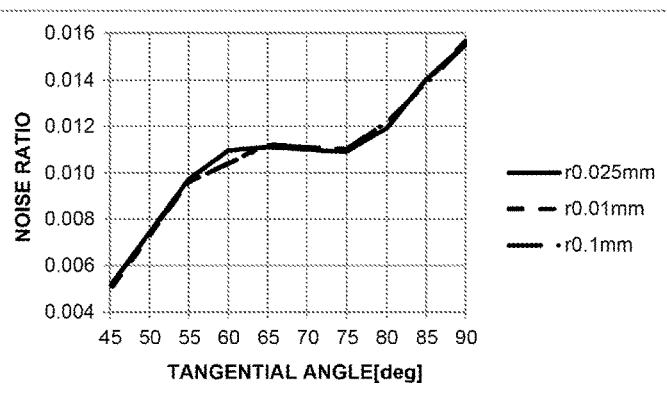
Figure 8:
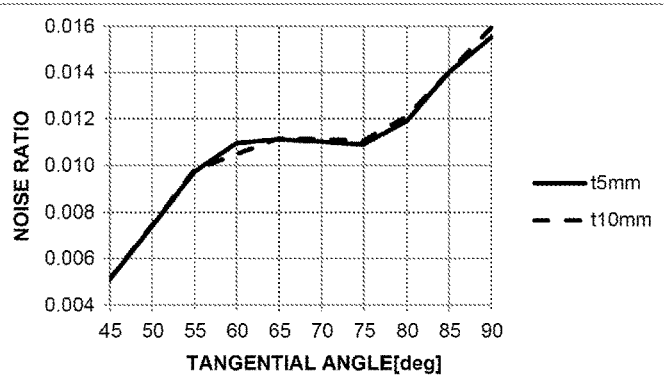
Figure 8:
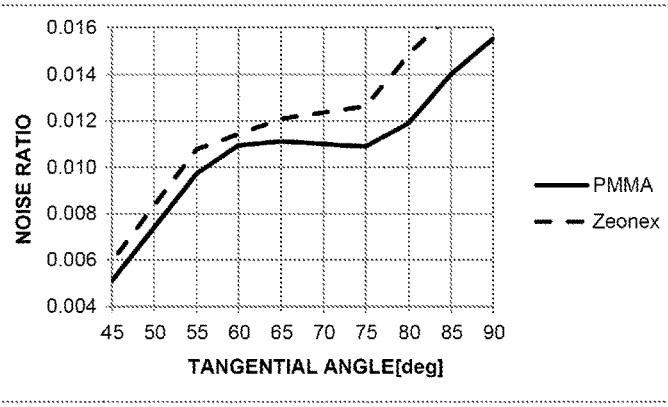
Figure 9:
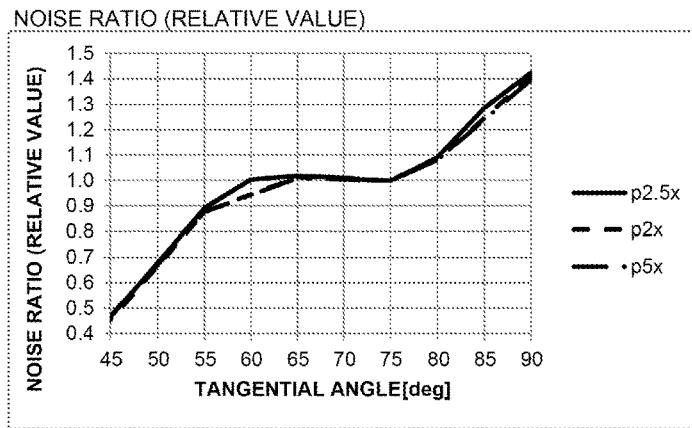
FIG. 9 is normalized graphs showing the relationship between the tangential angle θ and the noise ratio.
Figure 9:
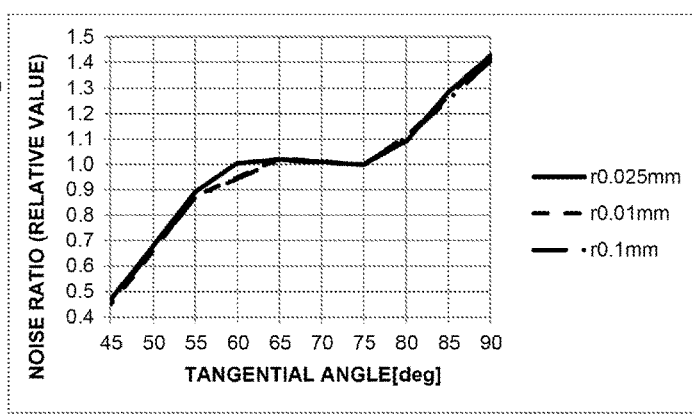
Figure 9:
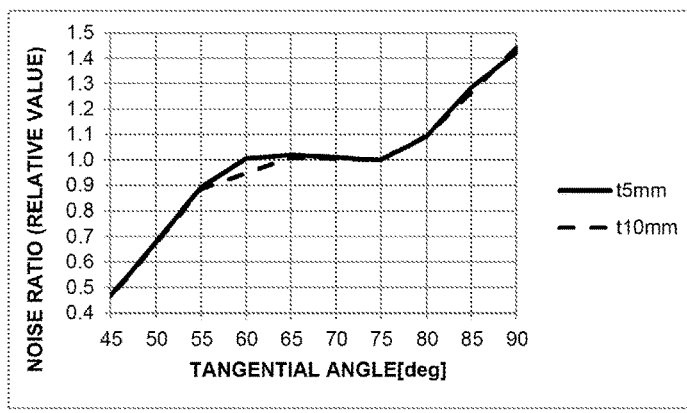
Figure 9:
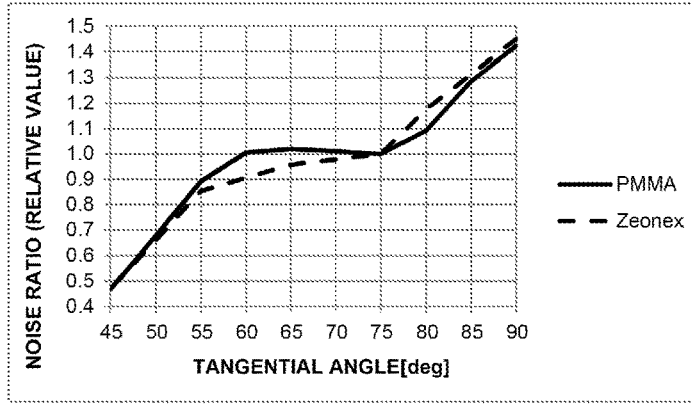

As is clear from FIG. 8, there is a clear inflection point in the noise ratio at the tangential angle θ of 75°. When the tangential angle θ exceeds the inflection point, the noise ratio increases rapidly. On the other hand, as the tangential angle θ is reduced from 75°, the noise ratio remains almost the same up to the tangential angle of about 60° and then slowly decreases when the tangential angle θ becomes less than or equal to 60°. FIG. 9 shows normalized graphs with the noise ratio of 1 at the tangential angle θ of 75°.

It can be observed from FIG. 8 and FIG. 9 that this tendency is the same even though the opening diameter of the concave parts 4, the pitch between the concave parts 4, the thickness of the light guide plate 1 or a material of the light guide plate 1 is changed.

As is clear from FIG. 8 and FIG. 9, it is very preferable for the leaked light that the tangential angle θ is set to less than or equal to 75°.

Next, the property of the irradiated light emitted to the workpiece W side will be described.

For inspection, it is regarded to be preferable that the light distribution property of the irradiated light (the light distribution property here is the light distribution property at a time when the light projecting device for inspection 100 can be considered as a point light source viewed from a point that is sufficiently separated from the light projecting device for inspection 100) is as equal as possible to the light distribution property in accordance with Lambert's cosine law (hereinafter referred to as Lambertian light distribution property).

Figure 10:
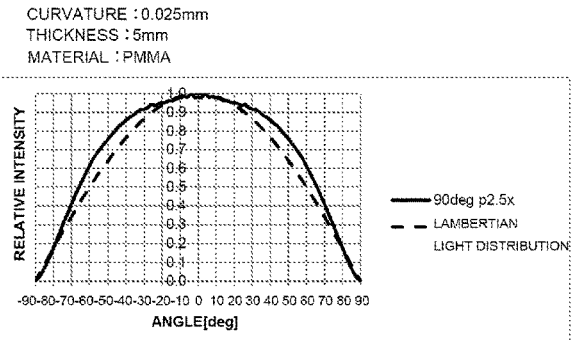
FIG. 10 is a view showing the light distribution property of the leaked light when the tangential angle θ is set at 90°, 75°, 72.2°, 55°, 50°, and 45° respectively.
Figure 10:
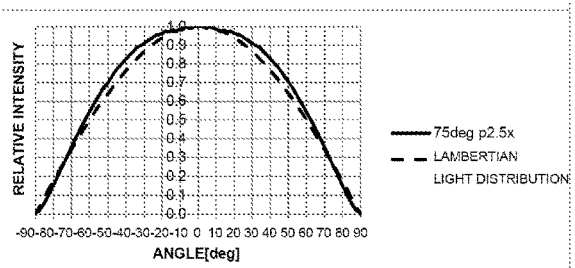
Figure 10:
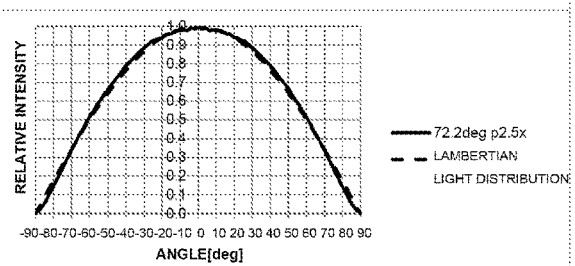
Figure 10:
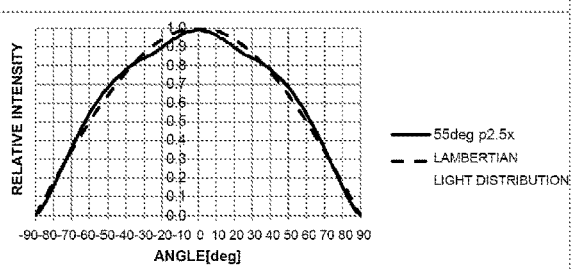
Figure 10:
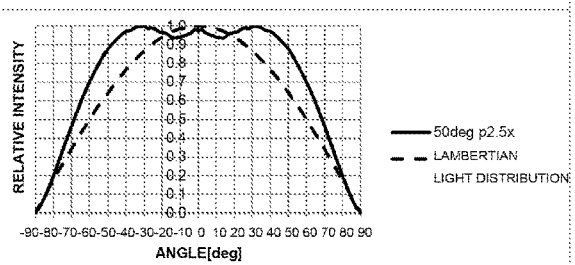
Figure 10:
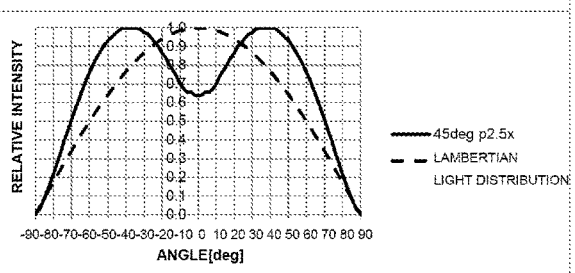
Figure 11:
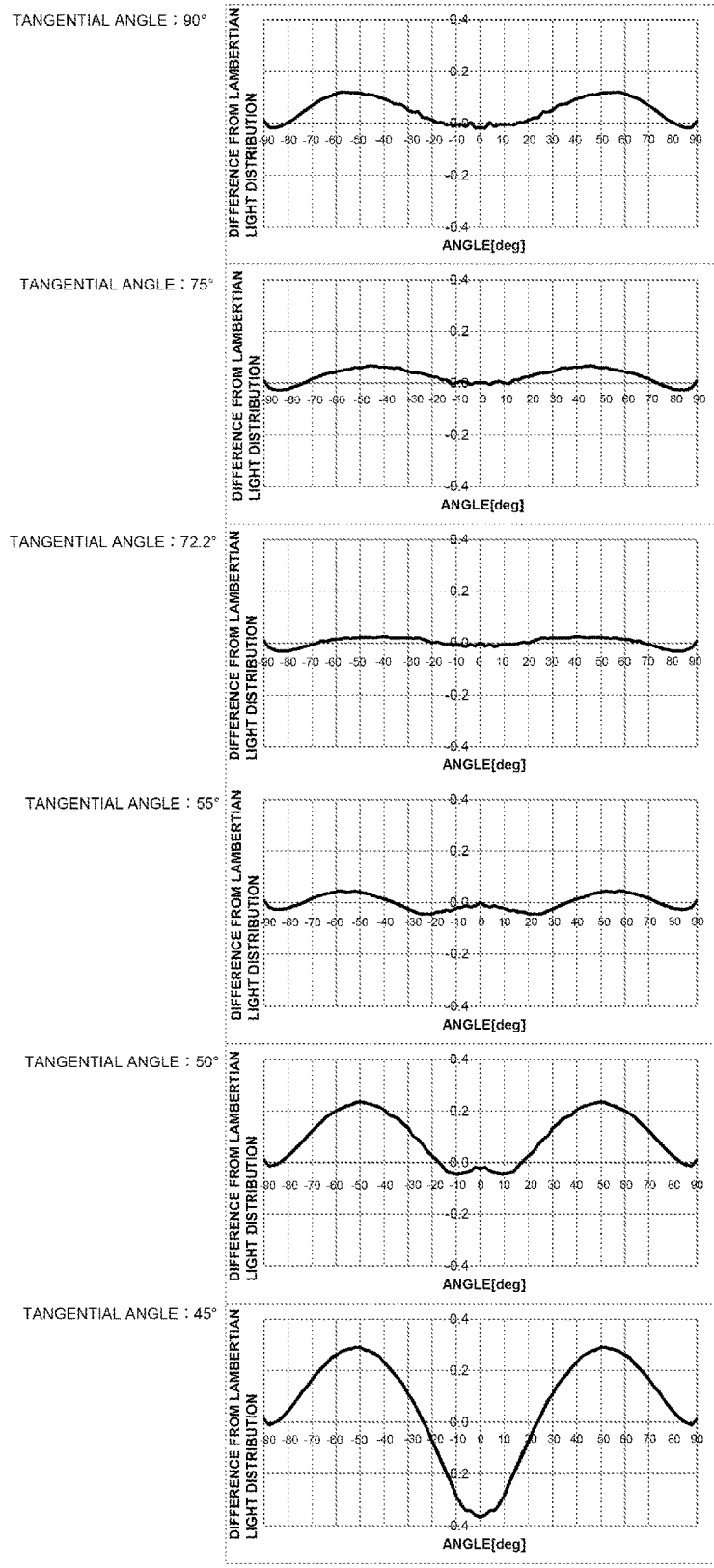
FIG. 11 is a view showing a difference between the light distribution property of the irradiated light and the Lambertian light distribution property when the tangential angle θ is set at 90°, 75°, 72.2°, 55°, 50°, and 45° respectively.

Then, the light distribution property of the irradiated light was examined at a time when each of the tangential angles θ is 90°, 75°, 72.2°, 55°, 50°, and 45°. The results are shown in FIG. 10. The difference between the light distribution property of the irradiated light at each of the tangential angles θ and the Lambertian light distribution property is shown in FIG. 11. The light distribution property of the irradiated light at the tangential angle θ of 72.2° was almost equal to the Lambertian light distribution property, and the light distribution property of the irradiated light at the tangential angle θ around 72.2° was slightly different from the Lambertian light distribution property.

Figure 12:
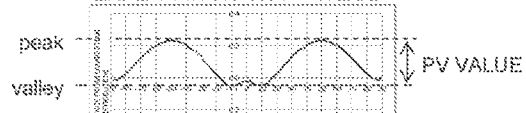
FIG. 12 is graphs showing a change of a PV value of the difference between the Lambertian light distribution property and the light distribution property of the irradiated light when the tangential angle θ is used as a parameter.
Figure 12:
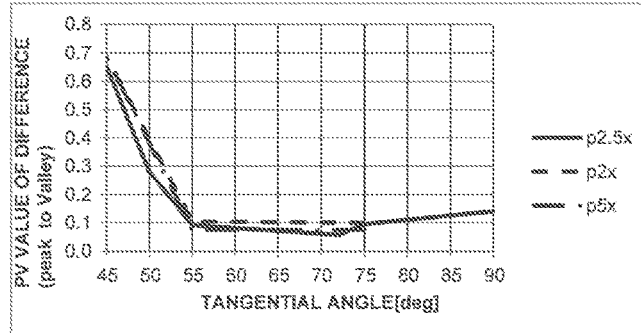
Figure 12:
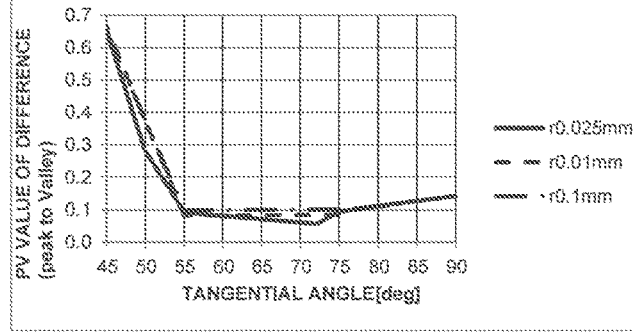
Figure 12:
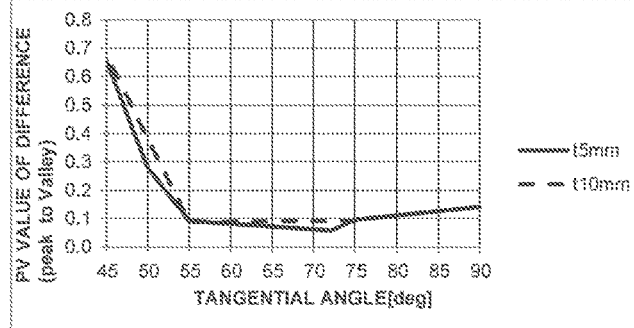
Figure 12:
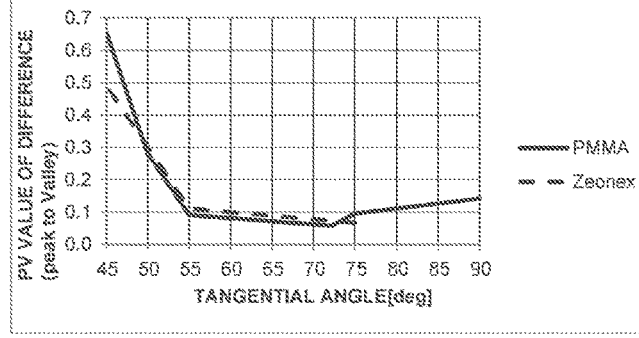

Based on these results, we investigated and graphed how a PV value (peak to valley value) of the difference between the Lambertian light distribution property and the irradiated light distribution property changes with the tangential angle θ as a parameter. FIG. 12 shows this. It can be seen from FIG. 12 that the light distribution property at the tangential angle θ of about 72° most closely resembles the Lambertian light distribution property and the PV value deteriorates rapidly when the tangential angle θ becomes below 55°. It can also be observed from FIG. 12 that the same is true even if the diameter φ of the concave part 4, the pitch of the concave part 4, the thickness of the light guide plate 1 or the material of the light guide plate 1 is changed.

As a result of this, as described above, if the tangential angle θ is set at greater than or equal to 55° and less than or equal to 75°, it is possible to reduce the leaked light that enters the camera C as much as possible and to maintain the light distribution property of the irradiated light within a predetermined range of the Lambertian light distribution property that is preferable for inspection.

In addition, if the opening diameter φ of the concave parts 4 is greater than or equal to 0.02 mm, the difficulty of manufacturing the light projecting device will not become remarkable, and if the opening diameter is less than or equal to 0.2 mm, it is possible to greatly reduce reflected glare of the light on the camera. Furthermore, if the pitch p between the adjacent concave parts 4 is greater than or equal to twice and less than or equal to five times the opening diameter φ of the concave part 4, it is possible to maintain the light distribution property of the irradiated light.

The present claimed invention is not limited to the above-mentioned embodiments.

For example, the tangential angle θ is not limited to less than or equal to 75°. As shown in FIG. 9, for example, since the leaked light in case the tangential angle θ is less than or equal to 85° is reduced by about 10% compared to a case that the tangential angle θ is 90° (hemispherical surface), and the leaked light in case the tangential angle θ is less than or equal to 80° is reduced by about 20% compared to a case that the tangential angle θ is 90° (hemispheric surface), even though an upper limit of the tangential angle is set to be 85° or 80°, it is possible to obtain a sufficient effect depending on the accuracy required for the inspection.

For the same reason, the tangential angle θ is not limited to greater than or equal to 55°, but may be about greater than or equal to 50°, or about greater than or equal to 52°.

Furthermore, the shape of the concave part may be not only the partially concave spherical surface but also a shape whose tangential angle gradually only increases (or decreases) as the surface of the concave part is smoothly changed in a circumferential direction. For example, the shape may be a partially oval sphere or a partially elliptic sphere.

Figure 13:
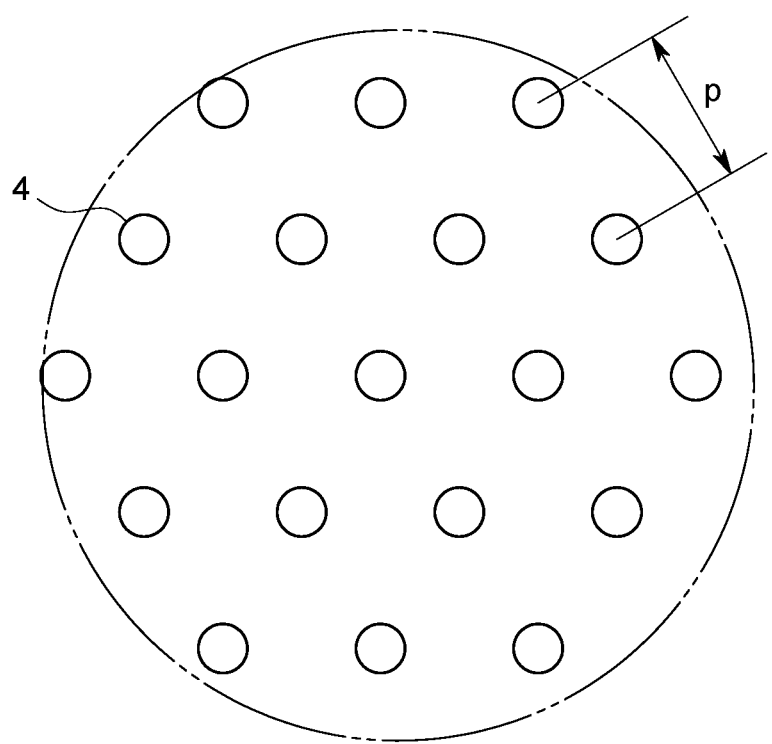
FIG. 13 is a plane view showing a layout of the concave part in another embodiment of this invention.

In addition, a layout of the concave parts may not be limited to a layout of square grid points, but, as shown in FIG. 13, may also a layout of equilateral triangle grid points, a random layout, or a layout of rectangular grid points. In case of the random layout, the pitch (spacing) shall be defined as an individual pitch up to the nearest concave part, and the average of those pitches shall be the pitch. In addition, in case of the layout of the rectangular grid points, the pitch shall be defined as the average of a long pitch and a short pitch.

In addition, it is a matter of course that the present claimed invention is not limited to each of the above-mentioned embodiments and may be variously modified without departing from a spirit of the invention.

INDUSTRIAL APPLICABILITY

In accordance with the present claimed invention, it is possible to provide a light projecting device capable of reducing leaked light leaking from a light guide plate to an observation means as much as possible and thereby reducing a noise component as well as increasing uniformity of the light irradiated on an object and improving an inspection accuracy.

The invention claimed is:

1. A light projecting device comprising:
a flat plate-shaped light guide plate and a light source body that introduces light from a side peripheral surface of the light guide plate to the inside thereof, wherein
a plurality of concave parts are formed on a first plate surface of the light guide plate,
the light guide plate is configured to reflect and spread the light entering the light guide plate at the concave parts, emit the light to the outside from a second plate surface of the light guide plate, and then irradiate the light to a predetermined object such that the object can be observed through the light guide plate from a side of the first plate surface of the light guide plate,
the surface of each of the concave parts is formed with a smooth concave curved surface, and
a tangential angle that is an angle between a tangential line at an opening edge of the concave part and the plate surface is set to be greater than or equal to 55° and less than or equal to 75° in a cross-sectional shape of the concave part cut by a plane that is both perpendicular to the plate surface and passing through the center of the concave part.

2. The light projecting device described in claim 1, wherein the concave part is in a partially concave sphere shape.

3. The light projecting device described in claim 1, wherein the concave part has an opening diameter of greater than or equal to 0.02 mm and less than or equal to 0.2 mm.

4. The light projecting device described in claim 1, wherein a pitch between adjacent concave parts is greater than or equal to twice and less than or equal to five times the opening diameter of the concave part.

5. A light projecting device comprising:
a plate-shaped light guide plate and a light source body that introduces light from a side peripheral surface of the light guide plate to the inside thereof, wherein
a plurality of concave parts are formed on a first plate surface of the light guide plate,
the light guide plate is configured to reflect and spread the light entering the light guide plate at the concave parts, emit the light to the outside from the other plate surface of the light guide plate, and then irradiate the light to a predetermined object such that the object can be observed through the light guide plate from a side of the first plate surface of the light guide plate,
the concave part is a partially concave spherical surface with a center angle of greater than or equal to 110° and less than or equal to 150°.

6. An inspection system comprising the light projecting device of claim 1 and a camera arranged on the side of the first plate surface of the light guide plate, wherein
the object arranged on a side of the second plate surface of the light guide plate can be inspected by taking a picture with the camera through the light guide plate.

* * * * *